United States Patent [19]

Yamamoto et al.

[11] Patent Number: 5,329,337
[45] Date of Patent: Jul. 12, 1994

[54] LENS LOADING APPARATUS

[75] Inventors: Takashi Yamamoto; Nobuo Watasa; Yoshio Ozawa, all of Kanagawa, Japan

[73] Assignee: Fuji Photo Film Co., Ltd., Kanagawa, Japan

[21] Appl. No.: 977,795

[22] Filed: Nov. 17, 1992

[30] Foreign Application Priority Data

Nov. 22, 1991 [JP] Japan .................... 3-307902

[51] Int. Cl.⁵ .................................. G03B 27/52
[52] U.S. Cl. .......................... 355/55; 355/57; 355/60; 355/63; 359/813; 359/814; 359/827
[58] Field of Search ............ 355/55, 57, 60, 63, 355/46; 359/813, 814, 827

[56] References Cited

U.S. PATENT DOCUMENTS 4,837,602  6/1989  Tahara ................... 355/55
5,105,312  4/1992  Tiffen et al. .............. 359/813

FOREIGN PATENT DOCUMENTS

1130108  9/1989  Japan .

Primary Examiner—Monroe H. Hayes
Attorney, Agent, or Firm—Sughrue, Mion, Zinn, Macpeak & Seas

[57] ABSTRACT

A lens loading apparatus for loading a lens held by a holding member into a lens loading unit disposed in the center of a support plate which extends substantially in a horizontal direction. The lens loading apparatus has a first reference surface formed in the upper surface of the support plate along a lens insertion direction and used for placing the holding member thereon. A second reference surface is formed on the support plate along the lens insertion direction and against which one end surface of the holding member, which extends along the lens insertion direction, abuts. The holding member, which is inserted from a horizontally-extending one end, is guided along the second reference surface by a first pressing member. Further, the holding member is guided along the first reference surface by a second pressing member, thereby making it possible to stably position the lens in a predetermined place.

20 Claims, 5 Drawing Sheets

LENS LOADING APPARATUS

BACKGROUND OF THE INVENTION

1. Field of the Invention

The present invention relates to a lens loading apparatus for loading a printing lens in a photographic printer.

2. Description of the Related Art

A printer-processor is referred to as a so-called mini laboratory and placed in a developing, printing and enlargement (DPE) shop or the like. In the printer-processor, an exposure unit for subjecting images recorded on a negative film to exposure and a processor unit for subjecting an exposed photographic paper to development are combined into a single unit. By simply setting an elongated photographic paper in place, the elongated photographic paper can be automatically conveyed to the exposure unit and the processor unit and processed thereat. In the exposure unit of the printer-processor, the images recorded on the negative film are enlarged to predetermined sizes and printed on photographic paper. The photographic paper on which the images of the negative film have been printed, is continuously conveyed to the processor unit where they are subjected to development so as to be finished as photographic prints.

With the spread of photographic cameras and the diversification of image processing, there is a demand for enlarging a part of an image frame of a negative film to a desired size and then printing the same. A lens employed in the exposure unit of the printer-processor is required to not only print each image of the negative film on photographic paper to a given size, but to have a zooming function as well.

Therefore, a printer-processor is known which is provided, as the lens of the exposure unit, with, for example, a fixed focus lens for printing an image of a negative film on photographic paper in a given size and a zoom lens for enlarging a part of an image of a negative film and printing the same on photographic paper. One of these lenses may be selected as needed for enlarging the image of the negative film to a desired size so as to print it on the photographic paper.

A lens loading/unloading apparatus for loading a lens into an exposure unit of a printer-processor has been disclosed in Japanese Utility Model Application Laid-Open No. 1-130108, for example. In this lens loading-/unloading apparatus, rollers are provided on both sides as seen in a lens insertion direction in a state in which a rotatable shaft has been inclined at a predetermined angle. Further, a lens is provided with a substantially-flattened holding member having a surface inclined at a predetermined angle in opposing relationship to a plurality of respective rollers. When the lens is loaded into a lens deck, the holding member is guided toward a predetermined position by the respective rollers disposed in facing relationship to the inclined surface thereof. Further, the lens is supported on the lens deck by these rollers together with the holding member.

It is however difficult to accurately place the rollers in facing relationship to the inclined surface of the holding member. When the lens is loaded into the lens deck, the lens is apt to shake or jolt. The lens, which has been loaded into the lens deck, is simply supported and held by these rollers which have been held in abutment against the inclined surface of the holding member. It is therefore difficult to reliably fix and hold the lens in a given position. Thus, the lens is jolted and becomes unfocused, so that a blurred image is often printed on the photographic paper.

SUMMARY OF THE INVENTION

With the above in view, it is an object of the present invention to provide a lens loading apparatus capable of reliably loading a lens into a predetermined position without any jerky or jolting movement.

According to a first aspect of the present invention, there is provided a lens loading apparatus for inserting and loading a lens held by a holding member into a lens loading unit disposed in a central portion of a substantially horizontally-disposed support plate so as to reach a predetermined position from a horizontally-extending one end, comprising:

a first reference surface provided at an upper surface of the support plate along the insertion direction of the lens, the first reference surface being used to place the holding member thereon;

a second reference surface provided at the support plate along the lens insertion direction, the second reference surface being brought into abutment against one end surface of the holding member, which extends along the lens insertion direction; and a first pressing member provided at a rear end, in the lens insertion direction, of the second reference surface, for bringing the holding member into abutment against the second reference surface so as to guide the same in a desired direction and for pressing the holding member against the second reference surface.

According to the lens loading apparatus constructed as described above, the holding member with the lens mounted thereon is placed on the first reference surface and inserted into a predetermined position in a state in which the holding member has been held in abutment against the second reference surface, thereby positioning the lens in place. The first pressing member for pressing the lens against the second reference surface is mounted in a lens insertion aperture of the support plate. The lens, which has been inserted into the lens loading unit, is held in abutment against the second reference surface by the first pressing member and guided to a predetermined position. Further, the lens, which has been inserted to the predetermined position, is brought into tight abutment against the second reference surface and held by the first pressing member. Therefore, the loaded lens can be reliably held without bringing the end thereof disposed on the lens insertion aperture side to an unstable state.

The lens loading apparatus may be provided with at least one second pressing member mounted on the far side as seen in the lens insertion direction, for bringing the holding member into abutment with the first reference surface so as to guide the same in a desired direction and for pressing the holding member against the first reference surface.

In this case, the lens, which has been placed onto the support plate, is held in abutment against the first reference surface by the second pressing member and guided toward a predetermined position. Further, the lens, which has been guided up to the predetermined position, is tightly held in abutment with the first reference surface and held by the second pressing member. Accordingly, the lens, which has been introduced into the support plate, is held in abutment against the first and second reference surfaces and reliably held by the first and second pressing members.

Further, the lens loading apparatus may be provided with a third reference surface which is formed on the far side as seen in the lens insertion direction and brought into abutment against the front end face of the holding member as seen in the lens insertion direction, and engaging means which is provided on the far side as seen in the lens insertion direction and held in engagement with the holding member so as to tightly bring the holding plate into abutment against the third reference surface.

In this case, the holding member tightly abuts the third reference surface. Therefore, the lens, which has been placed on the support plate, is accurately guided to the predetermined position and positioned thereat. Further, the lens can be reliably maintained at the predetermined position without any jerky movement.

According to a second aspect of the present invention, there is provided a lens loading apparatus for loading a lens held by a holding plate therein, comprising:

a support plate extending substantially in a horizontal direction;

an aperture provided in a central portion of the support plate and having one end opened to load the lens therein, the lens being inserted substantially horizontally to a predetermined position within the aperture from the opened one end thereof, and the support plate having a first reference surface which is defined in a peripheral edge of the aperture extending along the lens insertion direction and which is used to maintain the holding plate at a predetermined height and to place the same thereon, the peripheral edge being included in an upper surface of the support plate;

an elongated member disposed on the support plate along the lens insertion direction, for forming a second reference surface brought into abutment against one end surface of the holding plate, which extends along the lens insertion direction; and a first pressing member provided at a rear end, in the lens insertion direction, of the second reference surface, for bringing the holding plate into abutment against the second reference surface so as to guide the same in a desired direction and for pressing the holding plate against the second reference surface.

The lens loading apparatus may also be provided with at least one second pressing member provided on the far side as seen in the lens insertion direction, for bringing the holding plate into abutment against the first reference surface so as to guide the same in a desired direction and for pressing the holding plate against the first reference surface.

Furthermore, the lens loading apparatus may be provided with a block mounted on the far side as seen in the lens insertion direction, for forming a third reference surface against which the front end face of the holding plate as seen in the lens insertion direction abuts, and an engaging member mounted on the far side as seen in the lens insertion direction and held in engagement with the holding plate so as to bring the holding plate into abutment against the third reference surface.

According to a third aspect of the present invention, there is provided a lens loading apparatus suitable for use in a photographic processing system for printing an image on a photographic film onto photographic paper and used to load a printing lens held by a holding plate therein, comprising:

a support plate extending substantially in a horizontal direction, the support plate having an aperture defined centrally therein and whose one end is opened to load a lens therein, the lens being inserted substantially horizontally into a first predetermined position within the aperture from the opened one end thereof and having an axial center formed in an optical axis of light at the first predetermined position;

a lens holder rotatably supported in a vicinity of the support plate, for holding the lens in a second predetermined position where the lens is withdrawn from the support plate, the lens holder having an elongated hole defined therein for causing the lens to be fitted therein;

a first reference surface provided at a peripheral edge of the aperture along the lens insertion direction, the peripheral edge being included in an upper surface of the support plate, the first reference surface being used to maintain the holding plate at a predetermined height and to place the same thereon;

a second reference surface provided at the support plate along the lens insertion direction and brought into abutment against one end surface of the holding plate, which extends along the lens insertion direction; and a first pressing member provided at a rear end, in the lens insertion direction, of the second reference surface, for bringing the holding plate into abutment against the second reference surface so as to guide the same in a desired direction and for pressing the holding plate against the second reference surface.

According to the lens loading apparatus of the present invention, as has been described above, the holding member of the lens to be loaded is held in abutment against the first and second reference surfaces by the pressing members and guided toward the predetermined position. Therefore, the loaded lens can be simply guided toward a predetermined position without any kind of jerky movement.

The lens loading apparatus can also bring about excellent advantageous effects in that the holding member of the loaded lens can be pressed against the first and second reference surfaces by the pressing members and reliably maintained in a predetermined position.

The above and other objects, features and advantages of the present invention will become apparent from the following description and the appended claims, taken in conjunction with the accompanying drawings in which a preferred embodiment of the present invention is shown by way of illustrative example.

DETAILED DESCRIPTION OF THE PREFERRED EMBODIMENTS

Figure 1:
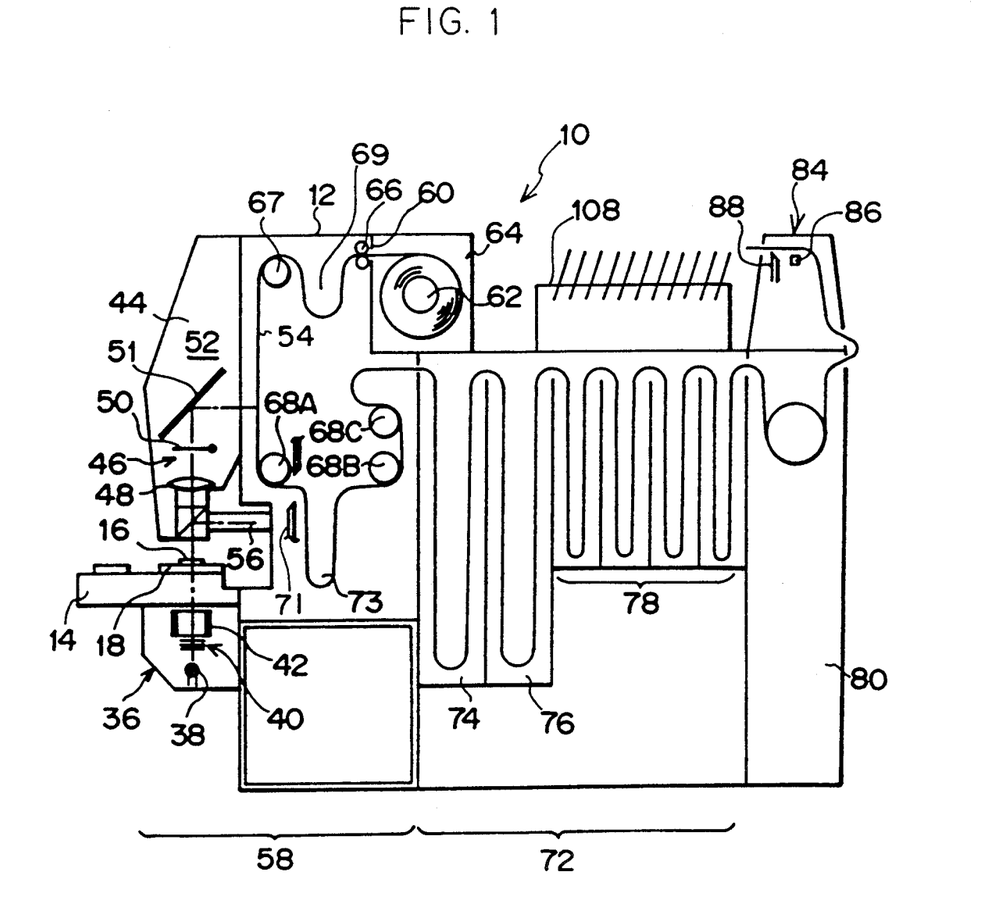
FIG. 1 is a schematic view showing a printer-processor which is applied to one embodiment of the present invention.

FIG. 1 shows a printer-processor 10 which serves as a part of a photographic processing system applied to one embodiment of the present invention. A description will first be made of the overall structure of the printer-processor 10.

The printer-processor 10 is externally covered by a casing 12. The printer-processor 10 is provided with a working table 14 which protrudes from the left side of the casing 12 as seen in FIG. 1. A negative carrier 18 loaded with a negative film 16 is placed on the upper surface of the working table 14. A light source unit 36 is disposed below the working table 14. The light source unit 36 is provided with a light source 38. Light emitted from the light source 38 is transmitted through a filter unit 40 and a diffusion barrel 42 to the negative film 16 loaded in the negative carrier 18. The filter unit 40 comprises three filters of cyan (C), magenta (M) and yellow (Y), each of which is able to enter into the optical axis of the light.

An optical system 46 is mounted to an arm 44 disposed above the working table 14. The optical system 46 has a lens 48, a shutter 50 and a reflecting mirror 51. The lens 48 and the shutter 50 are disposed in the optical axis of the light. The light, which has passed through the negative film 16, passes through the lens 48 and the shutter 50. The optical path of the light is changed by the reflecting mirror 51 (i.e., the optical axis of the light is changed about 90 degrees). Thereafter, an image of the negative film 16 is focused on photographic paper 54 set in an exposure chamber 52.

Further, the optical system 46 has a density measuring unit 56 such as a CCD, for measuring the density of the negative film 16. The density measuring unit 56 is electrically connected to an unillustrated controller, which sets an exposure correction value at the time of exposure based on data measured by the density measuring unit 56 and data input via keys operated by an operator.

An exposure unit 58, which enables printing processing, comprises the light source unit 36, the optical system 46 and the exposure chamber 52.

A magazine mounting portion 60 is disposed at the corner where the side face of the arm 44 as seen on the right-hand side thereabove meets the upper surface of the casing 12. A paper magazine 64 for winding the photographic paper 54 onto a reel 62 in layer form and accommodating the same therein is mounted on the magazine mounting portion 60.

A pair of rollers 66 is disposed in the vicinity of the magazine mounting portion 60, and horizontally conveys the photographic paper 54, which is disposed therebetween, to the exposure chamber 52. The photographic paper 54 is conveyed over a roller 67 in front of the arm 44 and turned 90 degrees so as to extend in a downward vertical direction. Incidentally, a first stock unit 69 for guiding the photographic paper 54 substantially in the form of a sagging U-shape and stocking the same therein is disposed between the pair of rollers 66 and the roller 67.

Rollers 68A, 68B, 68C are disposed below an exposure position in the exposure chamber 52. The photographic paper 54 on which the image of the negative film 16 has been printed within the exposure chamber 52, is turned by each of these rollers 68A, 68B and 68C about 90 degrees and conveyed to a color development portion 74 of a processor unit 72 adjacent to the exposure chamber 52.

A cutter 71 is provided on the downstream side of the roller 68A. The cutter 71 serves to cut the rear end of the photographic paper 54 which has already been subjected to an exposure process. Therefore, the photographic paper 54 which remains in the exposure chamber 52, can be rewound into the paper magazine 64.

Disposed between the roller 68A and the roller 68B is a second stock unit 73 which guides the photographic paper 54, which was subjected to the printing process, into a substantially sagging U-shaped form and stocks the same therein. The second stock unit 73 with the photographic paper 54 stocked therein, offsets the difference between a time interval required for the exposure unit 58 to apply printing processing to the photographic paper 54 and a time interval required for the processor unit 72 to apply development, fixing and washing to the photographic paper 54.

The color development unit 74 wets the photographic paper 54 with a developer so as to subject it to development. Thereafter, the developed photographic paper 54 is conveyed to a bleaching/fixing unit 76 provided adjacent to the color development unit 74. The bleaching/fixing unit 76 wets the photographic paper 54 with a liquid fixer so as to subject it to fixing. The photographic paper 54, which has been subjected to the fixing process, is conveyed to a rinsing unit 78 provided adjacent to the bleaching/fixing unit 76. The rinsing unit 78 wets the photographic paper 54 with rinsing water so as to subject it to a washing process.

The photographic paper 54, which has been subjected to the washing process, is conveyed to a drying unit 80 provided adjacent to the rinsing unit 78. In the drying unit 80, the photographic paper 54 is wound round a roller and dried with hot air. The photographic paper 54, which has been subjected to a drying process, is sandwiched between a pair of unillustrated rollers and discharged from the drying unit 80. A cutter unit 84 is provided on the downstream side of the drying unit 80. The cutter unit 84 comprises a cut mark sensor 86 for detecting a cut mark applied to the photographic paper 54 and a cutter 88 for cutting the photographic paper 54. The photographic paper 54 is cut for each image frame and discharged to the outside of the casing 12 of the printer-processor 10.

The cut photographic papers 54 are detected and sorted by a sorter 108. Thereafter, the photographic papers 54 are returned to a customer together with the statement of delivery and the negative film.

Figure 2:
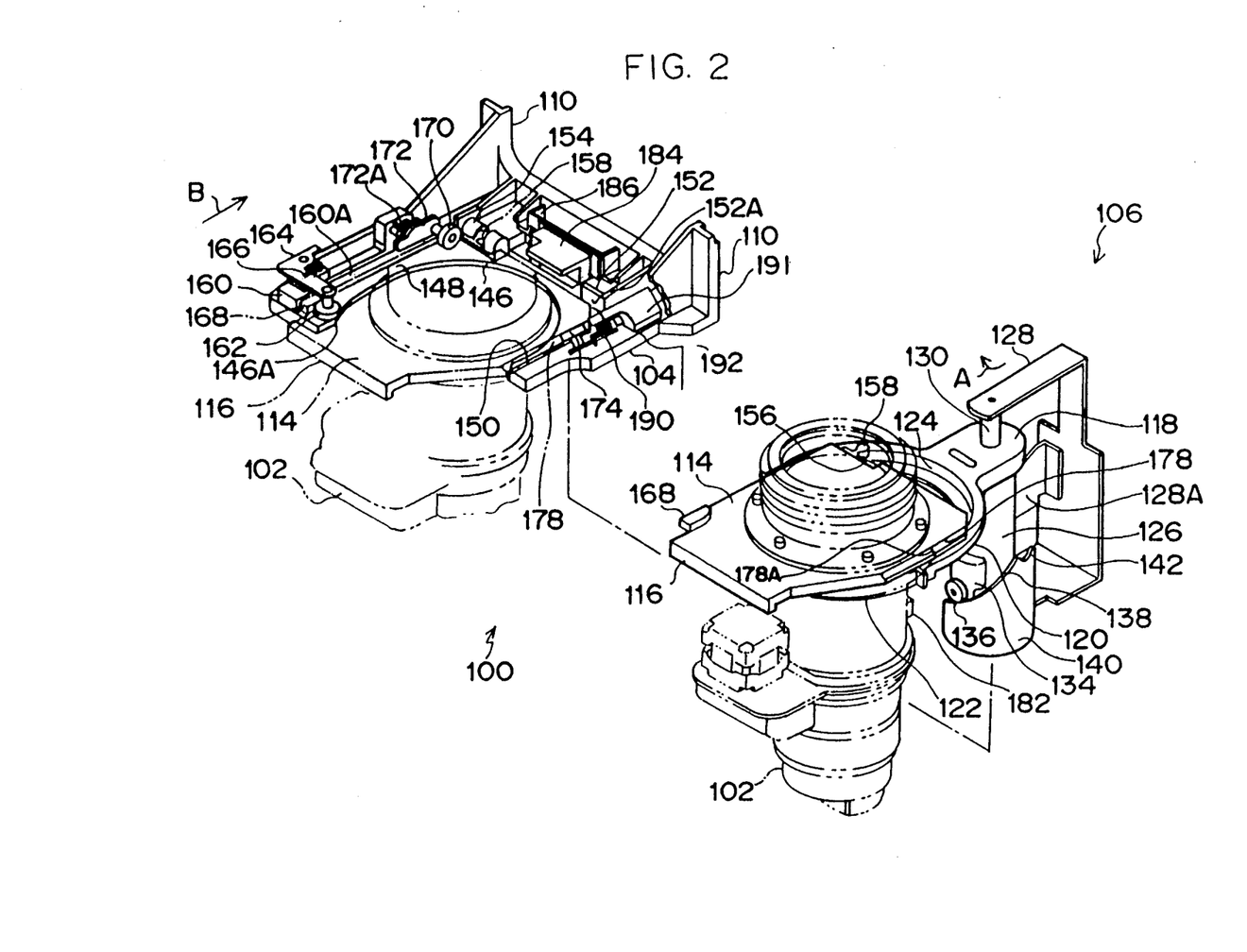
FIG. 2 is a perspective view showing a part of an optical system employed in the embodiment shown in FIG. 1.

As shown in FIG. 2, the optical system 46 is provided with a lens loading apparatus 100 for loading the lens 48 such as a fixed focus lens or a zoom lens or the like. The lens loading apparatus 100 comprises a lens deck 104 for loading the lens 48, and a lens holder 106 for withdrawing the lens 48 toward a predetermined position and supporting the same.

In the present embodiment, a description will hereinafter be made in the case where a zoom lens 102 which has been loaded into the lens holder 106 is inserted into the lens deck 104. The zoom lens 102 is shaped in the form of a cylinder and has a flange 112 coaxially disposed in an axially-extending intermediate portion thereof. A lens board 114 is disposed above the flange 112. The lens board 114 is shaped substantially in the form of a rectangular plate and has a central portion through which the zoom lens 102 extends. A grip 116 is formed on one end of the lens board 114.

Figure 4:
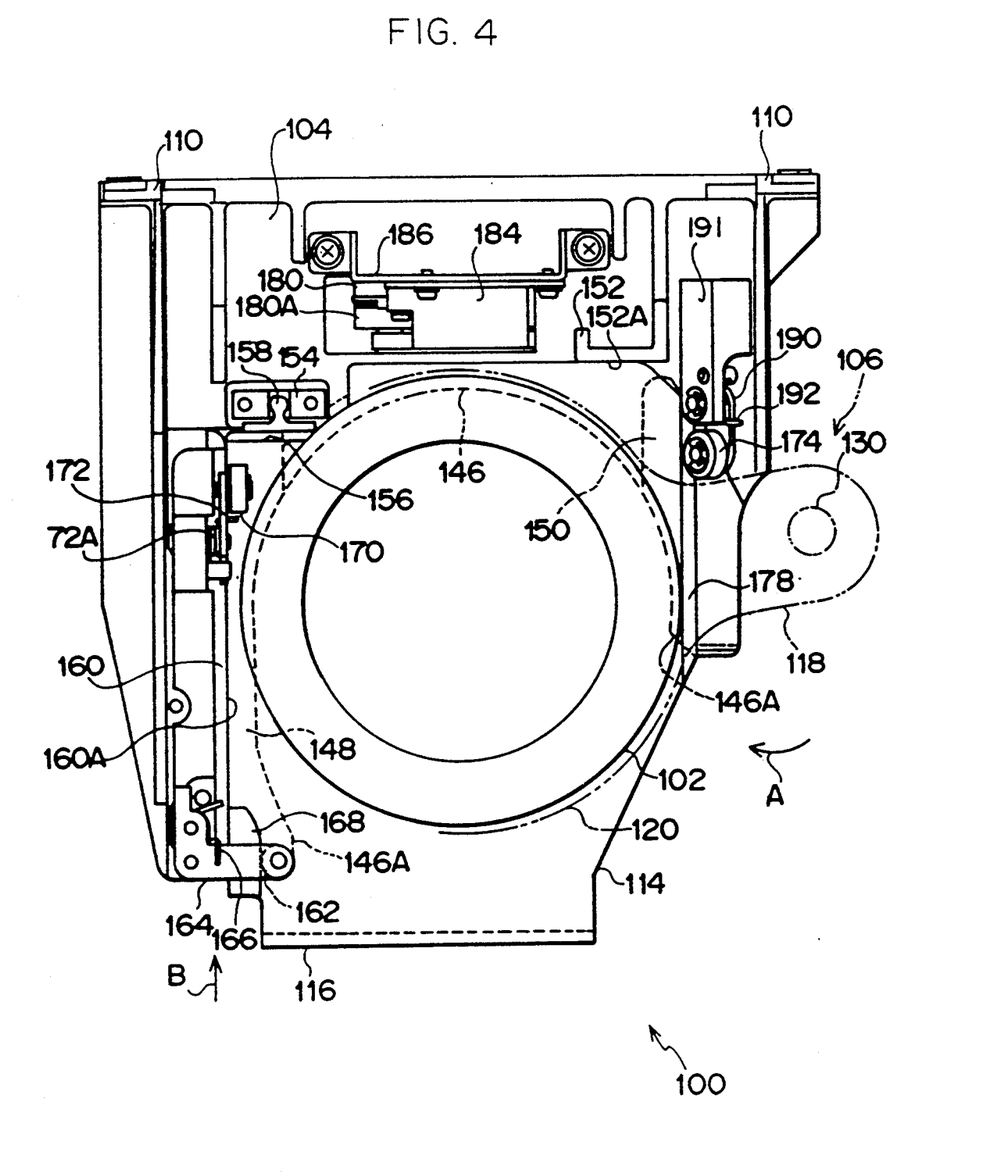
FIG. 4 is a plan view depicting a lens deck.

The lens deck 104 is disposed in opposing relationship to the negative carrier 18 placed on the working table 14 (not shown). Also, as shown in FIG. 4, the lens deck 104 is shaped substantially in the form of an inverted U-shaped frame. Further, the lens deck 104 is mounted to an unillustrated frame of the arm 44 by a bracket 110 so as to extend substantially in a horizontal direction.

Figure 3:
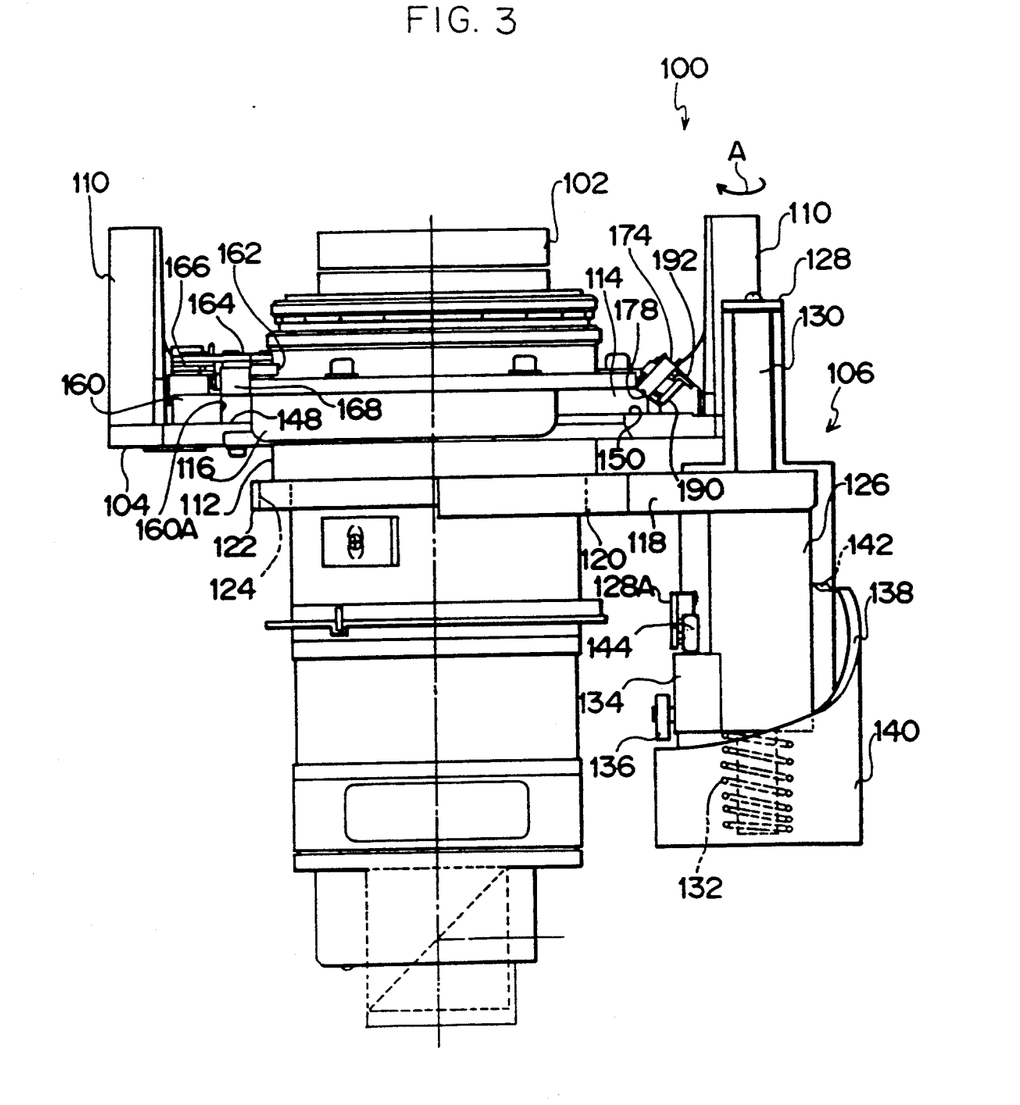
FIG. 3 is a front view illustrating the manner in which a lens is loaded.

As shown in FIGS. 2 and 3, the lens holder 106 for holding the zoom lens 102 in a position above the working table 14 and in a state in which the zoom lens 102 has been withdrawn upward from the working table 14, is disposed in the vicinity of a side portion of the lens deck 104. The lens holder 106 will first be described.

The lens holder 106 is provided with an arm 118. A fork 120, which is substantially of an arcuate shape, is formed on one end of the arm 118. The respective leading ends of a substantially U-shaped band 122 are connected to corresponding ends of the fork 120. An elongated hole 124 is defined by the band 122 and the fork 120. The zoom lens 102 is inserted through the elongated hole 124. The lower surface of the flange 112 of the zoom lens 102 is held in abutment against the fork 120 and the band 122. Thus, the zoom lens 102 is supported by the arm 118 so as to be prevented from falling. Further, the zoom lens 102 can be moved along the longitudinal direction of the elongated hole 124.

A cylinder 126 is formed integrally with the arm 118 at the other end of the arm 118 so as to extend in a downward direction. A shaft 130, with both ends supported by a bracket 128, extends vertically and rotatably through the cylinder 126. The bracket 128 is disposed in the vicinity of the lens deck 104. Thus, the zoom lens 102 is supported by the arm 118 in the vicinity of the lens deck 104.

A compression coil spring 132 is disposed between the lower end of the bracket 128 and the cylinder 126 and serves to urge the arm 118 together with the cylinder 126 in an upward direction.

A shoulder 134, which extends in a radial direction and is shaped in the form of a block, is mounted to the lower end of the cylinder 126 and provided with a roller 136. A cylindrical cam 140 having a cam surface 138 formed in an upper surface thereof is provided at the lower end of the bracket 128 in opposing relationship to the roller 136. Therefore, the zoom lens 102 may be pivotally rotated about the shaft 130 (in a direction indicated by the arrow A in FIGS. 2 and 3 and in a direction opposite the direction indicated by the arrow A). Further, the zoom lens 102 may be moved in upward and downward directions. Furthermore, the zoom lens 102 is placed on the lower end thereof on the lens deck 104 side and on the upper end thereof on the side opposite the lens deck 104 side. A recess 142 is defined in the upper end of the cam surface 138. The roller 136, which has been moved to the upper end of the cam surface 138 along the cam surface 138, is fit and held in the recess 142. When the arm 118 is turned to the lens deck 104, the fork 120 enters the position below the lens deck 104.

The bracket 128 has a side plate 128A on the lens deck 104 side. A roller 144 is mounted on the side plate 128A. The roller 144 is brought into abutment against the upper surface of the shoulder 134 of the cylinder 126 in a state in which the fork 120 has been placed in the position below the lens deck 104. The roller 144 prevents the cylinder 126 from being lifted upward by an urging force of the compression coil spring 132, thereby maintaining the arm 118 at a predetermined position. When the arm 118 is moved to the upper end thereof, the urging force of the compression coil spring 132 is reduced owing to the weight of the zoom lens 102. When, on the other hand, the arm 118 is moved to the lower end thereof, the urging force of the compression coil spring 132 is set so as to upwardly press the arm 118 against the weight of the zoom lens 102.

As shown in FIGS. 2 and 4, a lens loading portion or unit 146 whose axial center is formed in the optical axis of the light emitted from the light source 38 of the light source unit 36, is defined substantially in the central portion of the lens deck 104. The lens deck 104 has one end which is cut away toward the lens loading unit 146 so as to define a lens insertion opening or aperture 146A. The lens insertion aperture 146A is cut wide on the lens holder 106 side. The zoom lens 102, which may be rotated in the direction indicated by the arrow A about the shaft 130, can be inserted into the lens insertion opening 146A.

The zoom lens 102 is inserted into the lens insertion unit 146 (i.e., in the direction indicated by the arrow B in FIG. 2) through the lens insertion aperture 146A. At this time, the zoom lens 102 is inserted into the lens insertion unit 146 while being moved along the axial line of the elongated hole 124 by the fork 120 and the band 122.

Reference surfaces 148, 150 are formed on the upper surface of the lens deck 104 and at the peripheral edge of the lens loading unit 146 so as to extend on both sides along the direction in which the zoom lens 102 is inserted. The lower surface of the lens board 114 of the zoom lens 102 is brought into abutment against the reference surfaces 148, 150. Thus, the zoom lens 102 is positioned at a predetermined height with respect to the negative carrier 18 on the working table 14.

A block 152 and a pair of ball catches 154 are provided on the far or inner side of the lens deck 104 as seen in the direction in which the zoom lens 102 is inserted. The block 152 is shaped substantially in the form of an inverted U-shaped frame and has a convex intermediate portion used as a reference surface 152A. Further, the block 152 extends in the direction perpendicular to the lens insertion direction and along the upper surface of the lens deck 104. An end face of the lens board 114, which is located on the side opposite the grip 116 of the lens board 114, is brought into abutment against the reference surface 152A of the block 152. Thus, the lens board 114 can be positioned so as to extend in one direction along the upper surface of the lens deck 104.

The lens board 114 has a cut-away portion 156 defined therein in opposing relationship to the ball catches 154 and a projection 158 which projects from the cut-away portion 156. The projection 158 has a smoothly-formed intermediate portion and is inserted between the ball catches 154 so that the lens board 114 is tightly brought into abutment against the reference surface 152A of the block 152.

As shown in FIGS. 2 through 4, an elongated and rectangular block 160 is disposed on the upper surface of the lens deck 104 so as to be located adjacent to the reference surface 148 and to extend along the lens insertion direction from a position in the vicinity of the lens insertion aperture 146A. The surface of the block 160 on the lens loading unit 146 side is set as a reference surface 160A and brought into abutment against one end of the lens board 114, which is adjacent to the grip 116 of the lens board 114. When the lens board 114 is brought into abutment against the reference surface 152A of the block 152 and the reference surface 160A of the block 160, the axial center of the zoom lens 102 is positioned in the optical axis of the light source 38.

A roller 162 having a rotatable shaft, which extends in upward and downward directions, is provided on the lens insertion aperture 146A side as seen from the block 160. The roller 162 is rotatably supported by a substantially L-shaped end of an arm 164 and projects toward the lens insertion aperture 146A from the reference surface 160A. A coil spring 166 is mounted to the arm 164 so as to urge the roller 162 toward the reference surface 160A.

A substantially rectangular block 168 is formed on the lens board 114 so as to be located in the vicinity of the grip 116 in opposing relationship to the roller 162. A portion of the block 168, which is opposite to the grip 116, is smoothly reduced in width. When the lens board 114 is moved in the lens insertion direction, the block 168 is inserted between the roller 162 and the reference surface 160A while being in contact with the roller 162. As a result, the lens board 114 is guided while being in tight contact with the reference surface 160A of the block 160.

A roller 170 whose axial direction is horizontal, is provided at the far end of the block 160 of the lens deck 104 as seen in the lens insertion direction. The roller 170 is mounted to one end of an arm 172 and urged toward the reference surface 148 of the lens deck 104 by a coil spring 172A. The upper surface of the lens aboard 114 which has been loaded into the lens deck 104, is tightly fit on the reference surface 148 of the lens deck 104 by the roller 170 so as to be guided toward the inner part of the lens deck 104.

A roller 174 is provided on the side opposite the block 160 of the lens deck 104 and in the vicinity of the far side of the reference surface 150 as seen in the lens insertion direction. The roller 174 has a rotatable shaft which is inclined by a block 191 and an arm 190 (inclined at 45 degrees with respect to the horizontal direction in the present embodiment). A coil spring 192 is disposed between the block 191 and the arm 190 and serves to urge the roller 174 toward the reference surface 150 of the lens deck 104.

As illustrated in FIGS. 2 through 4, the lens board 114 has a slanted surface 178 which is held in engagement with the roller 174. As depicted in FIG. 2, the slanted surface 178 has an intermediate portion which is inclined so as to form the top 178A. The lens board 114 is inserted into the lens deck 104 until the top 178A reaches a position which slightly passes by the roller 174. Therefore, the lens board 114 is tightly fitted on the reference surface 150 of the lens deck 104 by the roller 174 and slightly pressed against the reference surface 152A of the block 152 and the reference surface 160A of the block 160.

Figure 5:
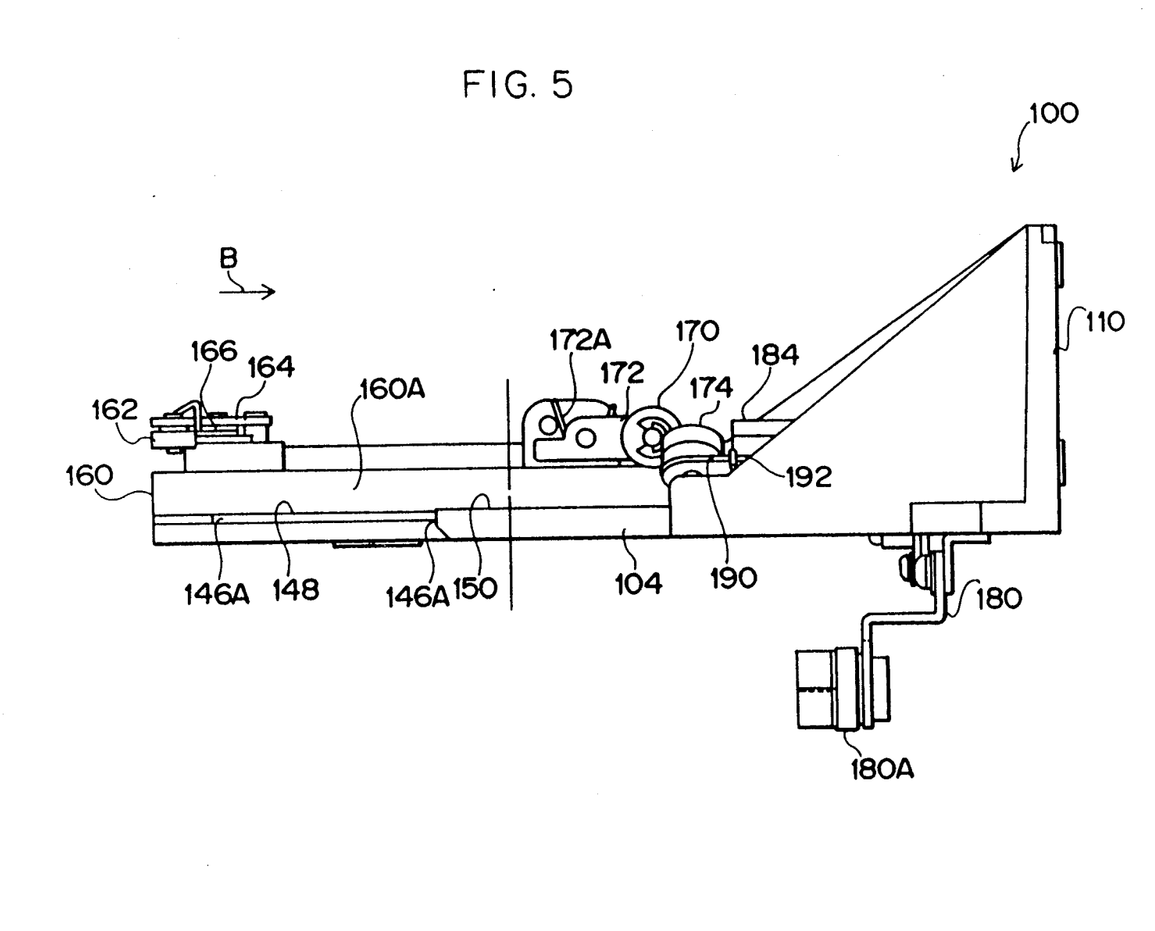
FIG. 5 is a side view showing the lens deck.

With this printer-processor 10, a connector 180A is mounted to the lower surface of the lens deck 104 as seen on the inner or far side of the lens deck 104 by a bracket 180 as illustrated in FIG. 5. As shown in FIG. 2, the zoom lens 102 has a connector 182 disposed in opposing relationship to the connector 182A. When the lens board 114 is positioned and loaded into the lens deck 104, the connectors 180A, 182 are connected to each other so as to electrically connect the zoom lens 102 to an unillustrated controller of the printer-processor 10. Thus, various operations of the zoom lens 102 are controlled by the controller.

Also, as shown in FIGS. 2 and 4, a photointerrupter 184 whose detecting element is directed toward the lens loading unit 146, is mounted to the inner or far part of the lens deck 104 as seen in the lens insertion direction by a bracket 186. The photointerrupter 184 detects whether or not the zoom lens 102 is in a loaded state.

The operation of the present embodiment will now be described below.

A description will first be made of a normal print processing sequence which is executed by the printer-processor 10.

When a printing process is started, the light source 38 is energized and the negative carrier 18 is driven so as to position the negative film 16 in place. Thereafter, the density measuring unit 56 measures the LATD (average density or level of transmitted-light) of the negative film 16. An exposure correction value is set based on the measured LATD data as well as data manually input via keys. Further, the amount of exposure (exposure time) is computed to determine the most suitable printing condition.

Next, the photographic paper 54 is conveyed to the exposure chamber 52 so as to be positioned in a predetermined place, and the shutter 50 is opened. Thus, the light emitted from the light source 38 passes through the filter unit 40, the diffusion barrel 42 and the negative film 16 so as to reach the exposure chamber 52. The printing of the images on the negative film 16 onto the photographic paper 54 positioned in the exposure chamber 52 is started. Then, the respective filters of C, M and Y, which are disposed in the optical axis of the light, are moved in accordance with exposure conditions. After a predetermined exposure time has elapsed, the shutter 50 is closed. Thus, the printing of the images on the negative film 16 onto the photographic paper 54 is completed as one frame. By repeating such a printing process, the respective photographic paper 54, which has been subjected to the printing process, are successively conveyed to the processor unit 72.

The photographic paper 54, which has been conveyed to the processor unit 72, is fed to the color development unit 74, where the developer is applied so as to be subjected to development. The photographic paper 54, which has been subjected to development, is conveyed to the bleaching/fixing unit 76 so as to be subjected to the fixing. The photographic paper 54, which has been subjected to the fixing, is conveyed to the rinsing unit 78 so as to be subjected to the washing process. Afterwards, the photographic paper 54 is conveyed to the drying unit 80 so as to be subjected to the drying process.

A cut mark on the dried photographic paper 54, is detected by the cutter unit 84. The photographic paper 54 is then cut for each image and the cut photographic papers 54 which are prints are sorted by the sorter 108.

A description will next be made of a process for attaching the zoom lens 102 which serves as the lens 48 to the lens deck 104 and detaching the same therefrom.

The zoom lens 102 is supported by the lens holder 106 so as to be located outwardly from the lens deck 104 in a state in which the zoom lens 102 has been separated from the working table 14. The zoom lens 102 is mounted to the lens deck 104 after other lenses which have been loaded into the lens deck 104, have been detached from the lens deck 104.

The grip 116, which has been formed in the lens board 114 of the zoom lens 102, is gripped and the arm 118 of the lens holder 106 is turned in the direction indicated by the arrow A in FIG. 2 so as to fit the zoom lens 102 in the lens insertion aperture 146A of the lens deck 104, thereby bringing the lens board 114 into abutment with the reference surface 160A of the block 160. In this condition, the fork 120 of the arm 118 is placed under the lens deck 104 and the lens board 114 of the zoom lens 102 is placed in a position near the upper surface of the lens deck 104.

Further, the lens board 114 is inserted into the lens loading unit 146 (along the direction indicated by the arrow B in FIG. 2) in a state in which it has been held in abutment against the reference surface 160A of the block 160.

At this time, the block 168 of the lens board 114 abuts the roller 162 and the lens board 114 is guided toward the lens deck 104 in a state in which it has been tightly held in abutment against the reference surface 160A of the block 160. Further, the roller 170 attached to the inner or far portion of the block 160 as seen in the lens insertion direction, is held in abutment against the upper surface of the lens board 114. The roller 174, which has been provided in the vicinity of the reference surface 150 of the lens deck 104, abuts the slanted surface 178 of the lens board 114. These rollers 170, 174 guide the lens board 114 toward the lens deck 104 while the lens board 114 is being tightly held in abutment against the reference surfaces 148, 150 on the lens deck 104.

When the lens board 114 is inserted into the far portion of the lens loading unit 146, the projection 158 of the lens board 114 is inserted and held between the ball catches 154 so as to cause the lens board 114 to tightly abut against the reference surface 152A of the block 152.

As a result, the lens board 114 tightly abuts against the reference surfaces 148, 150, 152A, 160A of the lens deck 104 in the state shown in FIGS. 3 and 4, so that the axial center of the zoom lens 102 is formed in the optical axis of the light emitted from the light source 38. Further, the zoom lens 102 is positioned at a predetermined height from the working table 14.

Thus, when the lens board 114 of the zoom lens 102 is inserted into the lens deck 104, this side of the lens board 114 as seen in the lens insertion direction is tightly brought into abutment against the reference surface 160A extending along the lens insertion direction by the roller 162. The far side of the lens board 114 as seen in the lens insertion direction, is tightly held in abutment against the reference surface 148 by the roller 170 and the reference surface 150 by the roller 174 so as to be guided toward the lens deck 104. As a result, the lens board 114 to be inserted into the lens deck 104, i.e., the zoom lens 102, can be stably inserted and loaded into the lens deck 104.

The lens board 114, which has been inserted into the lens deck 104, is tightly held in abutment against the reference surface 160A of the block 160 by the roller 162, the reference surface 148 by the roller 170 and the reference surface 150 by the roller 174 so as to be held in place. The lens board 114 is then held in a state in which it has tightly been held in abutment against the reference surface 152A of the block 152. Therefore, the zoom lens 102 is no longer shaken or jolted after being loaded into the lens deck 104. Further, an image of the negative film 16 can be focused and printed on photographic paper 54 at a predetermined size.

Having now fully described the invention, it will be apparent to those skilled in the art that many changes and modifications can be made without departing from the spirit or scope of the invention as set forth herein.

What is claimed is:

1. A lens loading apparatus for inserting and loading a lens held by a holding member into a lens loading unit disposed in a central portion of a substantially horizontally-disposed support plate so as to reach a predetermined position from a horizontally-extending one end, comprising:

a first reference surface provided at an upper surface of said support plate along the insertion direction of said lens, said first reference surface being used to place said holding member thereon;

a second reference surface provided at said support plate along said lens insertion direction, said second reference surface being brought into abutment against one end surface of said holding member, which extends along said lens insertion direction; and a first pressing member provided at a rear end, in said lens insertion direction, of said second reference surface, for bringing said holding member into abutment against said second reference surface so as to guide the same in a desired direction and for pressing said holding member against said second reference surface.

2. A lens loading apparatus according to claim 1, further comprising:

at least one second pressing member provided at a front portion, in said lens insertion direction, of said support plate, for bringing said holding member into abutment against said first reference surface so as to guide the same in a desired direction and for pressing said holding member against said first reference surface.

3. A lens loading apparatus according to claim 1, further comprising:

a third reference surface provided at a front portion, in said lens insertion direction, of said support plate and brought into abutment against the front end face of said holding member as seen in said lens insertion direction.

4. A lens loading apparatus according to claim 3, further comprising:

engaging means provided at a front portion, in said lens insertion direction, of said support plate and brought into engagement with said holding member so as to tightly hold said holding plate in abutment against said third reference surface.

5. A lens loading apparatus according to claim 1, wherein said first reference surface includes two surfaces of equal height formed on opposite sides of a peripheral edge of said lens loading unit, one of which intersects said second reference surface.

6. A lens loading apparatus according to claim 5, further comprising:

at least one second pressing member provided at a front side, in said lens insertion direction, of said one of said two surfaces included in said first reference surface, for bringing said holding member into abutment against said first reference surface so as to guide the same in a desired direction and for pressing said holding member against said first reference surface.

7. A lens loading apparatus according to claim 5, further comprising:

at least two second pressing members respectively provided at front portions, in said lens insertion direction, of said two surfaces included in said first reference surface, for bringing said holding member into abutment against said first reference surface so as to guide the same in a desired direction and for pressing said holding member against said first reference surface.

8. A lens loading apparatus for loading a lens held by a holding plate therein, comprising:

a support plate extending substantially in a horizontal direction;

an aperture provided in a central portion of said support plate and having one end opened to load said lens therein, said lens being inserted substantially horizontally to a predetermined position within said aperture from said opened one end thereof, and said support plate having a first reference surface which is defined in a peripheral edge of said aperture extending along said lens insertion direction and which is used to maintain said holding plate at a predetermined height and to place the same thereon, said peripheral edge being included in an upper surface of said support plate;

an elongated member disposed on said support plate along said lens insertion direction, for forming a second reference surface brought into abutment against one end surface of said holding plate, which extends along said lens insertion direction; and a first pressing member provided at a rear end, in said lens insertion direction, of said second reference surface, for bringing said holding plate into abutment against said second reference surface so as to guide the same in a desired direction and for pressing said holding plate against said second reference surface.

9. A lens loading apparatus according to claim 8, wherein said first pressing member includes a roller for interposing a convex portion formed on said holding plate between said second reference surface and said roller so as to guide the same in a desired direction, and a spring for urging said roller toward said second reference surface.

10. A lens loading apparatus according to claim 8, further comprising:

at least one second pressing member provided at a front portion, in said lens insertion direction, of said support plate, for bringing said holding plate into abutment against said first reference surface so as to guide the same in a desired direction and for pressing said holding plate against said first reference surface.

11. A lens loading apparatus according to claim 10, wherein said second pressing member includes a roller for interposing said holding plate between said first reference surface and said roller so as to guide the same in a desired direction, and a spring for urging said roller toward said first reference surface.

12. A lens loading apparatus according to claim 8, further comprising:

a block provided at a front portion, in said lens insertion direction, of said support plate, for forming a third reference surface brought into abutment against a front end surface of said holding plate as seen in said lens insertion direction.

13. A lens loading apparatus according to claim 12, further comprising:

an engaging member provided at a front portion, in said lens insertion direction, of said support plate and brought into engagement with said holding plate so as to tightly hold said holding plate in abutment against said third reference surface.

14. A lens loading apparatus according to claim 8, wherein said lens loading apparatus is employed in a photographic processing system for printing an image on a photographic film onto photographic paper and used to load a printing lens therein.

15. A lens loading apparatus suitable for use in a photographic processing system for printing an image on a photographic film onto photographic paper and used to load a printing lens held by a holding plate therein, comprising:

a support plate extending substantially in a horizontal direction, said support plate having an aperture defined centrally therein and whose one end is opened to load a lens therein, said lens being inserted substantially horizontally inserted into a first predetermined position within said aperture from said opened one end thereof and having an axial center formed in an optical axis of light at said first predetermined position;

a lens holder rotatably supported in a vicinity of said support plate, for holding said lens in a second predetermined position where said lens is withdrawn from said support plate, said lens holder having an elongated hole defined therein for causing said lens to be fitted therein;

a first reference surface provided at a peripheral edge of said aperture along said lens insertion direction, said peripheral edge being included in an upper surface of said support plate, said first reference surface being used to maintain said holding plate at a predetermined height and to place the same thereon;

a second reference surface provided at said support plate along said lens insertion direction and brought into abutment against one end surface of said holding plate, which extends along said lens insertion direction; and a first pressing member provided at a rear end, in said lens insertion direction, of said second reference surface, for bringing said holding plate into abutment against said second reference surface so as to guide the same in a desired direction and for pressing said holding plate against said second reference surface.

16. A lens loading apparatus according to claim 15, wherein said lens is inserted into said first predetermined position from said second predetermined position while said lens holder is being rotated.

17. A lens loading apparatus according to claim 16, wherein said lens holder is maintained in an upward position by cam means when said lens is inserted into said second predetermined position as compared with the insertion of said lens into said first predetermined position.

18. A lens loading apparatus according to claim 15, further comprising:

at least one second pressing member provided at a front portion, in said lens insertion direction, of said support plate, for bringing said holding plate into abutment against said first reference surface so as to guide the same in a desired direction and for pressing said holding plate against said first reference surface.

19. A lens loading apparatus according to claim 15, further comprising:

a third reference surface provided at a front portion, in said lens insertion direction, of said support plate and brought into abutment against a front end surface of said holding plate as seen in said lens insertion direction.

20. A lens loading apparatus according to claim 15, further comprising:

engaging means provided at a front portion, in said lens insertion direction, of said support plate and brought into engagement with said holding plate so as to tightly hold said holding plate in abutment against said third reference surface.

* * * * *